United States Patent [19]

Beech et al.

[11] Patent Number: 4,732,943

[45] Date of Patent: Mar. 22, 1988

[54] DENTAL RESTORATIVE MATERIAL

[75] Inventors: Derrick R. Beech, Greensborough; Ezio Rizzardo, Wheelers Hill; Wayne D. Cook, Northcote; Malcolm C. Smail, North Melbourne, all of Australia

[73] Assignee: Commonwealth Scientific and Industrial Research Organization

[21] Appl. No.: 854,026

[22] Filed: Apr. 21, 1986

[30] Foreign Application Priority Data

Apr. 24, 1985 [AU] Australia ............................. PH0281

[51] Int. Cl.$^4$ ........................................... C08F 265/04
[52] U.S. Cl. ................................... 525/303; 522/123; 523/109; 528/354; 528/361
[58] Field of Search ................. 525/303; 528/354, 361; 522/123; 523/109

[56] References Cited

U.S. PATENT DOCUMENTS

| | | | |
|---|---|---|---|
| 3,446,875 | 5/1969 | Brückmann et al. | 525/303 |
| 3,872,047 | 3/1975 | Jandourek | 525/286 |
| 3,914,341 | 10/1975 | Kliment et al. | 525/303 |
| 3,997,627 | 12/1976 | Ichimura et al. | 525/303 |
| 4,091,052 | 5/1978 | Horii et al. | 525/303 |
| 4,108,666 | 8/1978 | Hayashi et al. | 522/123 |
| 4,182,035 | 1/1980 | Yamauchi et al. | 433/228 |
| 4,340,529 | 7/1982 | Lee, Jr. et al. | 524/105 |
| 4,340,532 | 7/1982 | Lee, Jr. et al. | 524/854 |
| 4,368,043 | 1/1983 | Yamauchi et al. | 433/217 |
| 4,368,320 | 1/1983 | Aldinger et al. | 528/354 |
| 4,475,998 | 10/1984 | Okitsu et al. | 528/354 |
| 4,504,635 | 3/1985 | Weber, Jr. et al. | 528/354 |

FOREIGN PATENT DOCUMENTS 60-67446  4/1985  Japan .

*Primary Examiner*—Joseph L. Schofer
*Assistant Examiner*—Bernard Lipman
*Attorney, Agent, or Firm*—Bacon & Thomas

[57] ABSTRACT

An adhesive for attaching polymeric or polymerizable restorative materials to dentine or other tooth structure, which comprises a polymer of (a) a condensate of ε-caprolactone with one or more acrylic monomers containing hydroxy groups and (b) a polymer containing binding groups capable of binding to the dentine or other tooth structure, optionally dissolved in a suitable solvent.

The adhesive may be used in adhesive compositions including polymerizable monomers, polymerization initiators or fillers.

17 Claims, No Drawings

DENTAL RESTORATIVE MATERIAL

This invention is concerned with the treatment of dental caries, in particular with materials for the restoration of teeth after the removal of decayed material.

The removal of caries and the restoration of the decayed tooth is common in the practice of dentistry. The most common materials used during this century for such restorations have been amalgams of mercury with other metals, gold, acid-base cements, or fused porcelain. Commonly the materials are used in a maleable or plastic form and harden after insertion into the cavity.

These materials have little or no adhesion to the dentine in the tooth and consequently the cavity must be undercut to provide a mechanical means of holding the solidified restorative material into the tooth. Very few suitable adhesives have been available to assist in the retention of such materials.

Polymerizable restorative materials are becoming increasingly used around the world. These materials are supplied in the form of low viscosity liquids or pastes and are consequently readily inserted into the cavity in the tooth, filling it completely and providing an aesthetic result not possible with amalgam. Once in place a polymerization reaction is initiated converting the liquid or paste into a hard polymeric solid. The polymerization reaction is commonly initiated by visible light but it may also be initiated by the mixing of two or more initiator components immediately before the insertion of the restorative material into the tooth cavity. Alternatively a combination of these methods may be used. The adhesion of the current polymerizable restorative materials to dentine is poor and cavities must still be undercut to ensure retention of the restoration and adequate sealing. Various adhesives and pretreatments of the dentine have been used in an attempt to promote the adhesion of polymerizable restorative materials to dentine to yield reliable adhesion and sealing without the need for undercutting the tooth cavity, but these prior art adhesives have not been sufficiently reliable.

This invention is concerned with adhesives for attaching polymerizable restorative materials to teeth which consists of a polymer which contains groups which bind strongly to dentine or other tooth structure and other groups capable of being incorporated into the polymerizable restorative material. Such adhesive may also contain, if necessary, suitable solvents polymerizable monomers and fillers to provide materials of suitable viscosity or gap filling properties.

U.S. Pat. No. 3,872,047 (Jandourek) broadly describes dental restorative compositions containing polymeric materials of the general type described above and gives examples of such materials, in particular the reaction products of polyacrylic acid and either glycidyl methacrylate or sulfoethylmethacrylate.

We have now found that certain specific polymeric materials are unexpectedly superior when the polymers are used in dental restoratives.

According to the present invention there is provided an adhesive for attaching polymeric or polymerizable restorative materials to dentine or other tooth structure, which comprises a polymer of (a) a condensate of ε-caprolactone with one or more acrylic monomers containing hydroxy groups and (b) a polymer containing binding groups capable of binding to the dentine or other structure, optionally dissolved in a suitable solvent.

Preferably polymer (b) contains a multiplicity of binding groups.

Suitable binding groups are well known to those skilled in the art. In one embodiment of this invention the binding groups are groups capable of complexing calcium ions especially by chelation. In a preferred example of this embodiment of this invention the binding groups are carboxylate groups either directly connected to the polymer chain or connected via a branched or unbranched substituted or unsubstituted alkene group or alternatively the carboxylic group may be part of a polymer or oligomer chain attached to the main chain of the adhesive molecule. Such polymer chains may themselves contain a plurality of carboxylic groups. Suitable carboxylic groups are —COOH, —(CH$_2$)$_n$COOH, where n may be from 1 to 60,

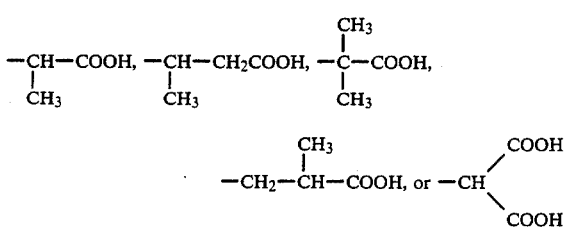

The preferred polymer (b) is poly(acrylic acid).

In another embodiment of this invention the dentine binding groups are phosphate or related groups.

The preferred component (a) is a condensate of ε-caprolactone and 2-hydroxyethyl methacrylate, especially the commercially available product PLACCEL FM-1 (Daicel Chemical Industries Ltd., Japan), which has the formula

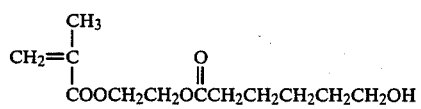

The polymers of this invention may be produced by the conventional methods of polymer chemistry appropriate to the monomers used and the structures desired for the adhesive molecule. If the adhesive polymer is to contain carboxylic or other groups which may interfere with or react during the polymerization a suitable derivative easily convertible to the desired group may be used as the monomer with appropriate later conversion of the polymer formed into that desired for the dental adhesive, for example acrylonitrile may be used as a monomer and the resulting polymer hydrolysed to produce carboxylic acid groups.

Where adhesive polymers of carefully controlled structure are required they may be made by the controlled growth free radical method of Rizzardo, Solomon and Caccioli (Australian Patent Application No. 30378/84) which is capable of providing random, block or graft copolymers of carefully controlled molecular weight and monomer sequence distribution.

Alternatively the polymers of this invention may be made by the methods of step-growth polymerization using the appropriate monomers. As a further alternative a multistage process using both step growth and chain growth polymerizations may be utilized.

Compositions in accordance with this invention suitable for use as adhesives for polymerizable dental restorative materials may be made by dissolving the previously described polymers in suitable solvents which are orally acceptable to produce a fluid of viscosity low enough to be applied by brush or spray to the inside of the tooth cavity. The solvent may be capable of polymerization. Inert fillers, stabilizers or curing agents may be added to such compositions. Ideally the adhesive polymers of this invention are of sufficiently low molecular weight that no solvent is needed and they may be applied directly to the inside of the tooth cavity.

The adhesives of this invention are applied as a thin layer to the inside of the tooth cavity, any solvent evaporated off by use of a jet of warm air or similar means, the adhesive cured by light if necessary, then the polymerizable restorative material added to completely fill the cavity and the material polymerized to produce a sound and mechanically secure restoration.

With this method the tooth cavity does not need to be undercut resulting in a simpler, more rapid restoration procedure.

The following experimental examples serve to illustrate the working of our invention and the benefits obtainable from its use.

METHOD OF TESTING BOND STRENGTH

The crowns of recently extracted human teeth which had been stored in water were embedded in acrylic cylinders. Flat non-carious dentine surfaces were exposed by grinding the ends of the cylinders on wet silicon carbide paper whilst held tightly against a right angled "V" block, finishing with 600 grade SiC paper. PVC adhesive tape with a 3.5 mm hole was applied to the dentine surface and the exposed dentine was lightly pumiced using a brush on a slow-speed handpiece and rinsed with a stream of distilled water. The dentine was dried of surface water and the adhesive under test was prepared, applied to the dentine surface and excess solvent evaporated for 5 seconds with a stream of dry air. If necessary the adhesive layer was photocured for 10-20 seconds with a commercial dental photocuring unit. Self-curing dental composite resin was mixed and applied to 3.5 mm diameter stainless steel mesh backed orthodontic buttons (these buttons had previously been attached to a loop of orthodontic wire to enable a tensile force to be applied to the buttons). The surfaces of the adhesive and the uncured composite were brought into contact under light pressure for 5 seconds and then the composite resin was allowed to polymerize in a 100% RH environment. Fifteen minutes after applying the adhesive the assembly was placed in water at 23° C. After 24 hour immersion the assembly was mounted in a Shimadzu tensile testing machine and the bond strength determined at a crosshead speed of 1 mm/min. Bond strengths were determined on at least 5 teeth from which a mean and standard deviation were obtained.

PRIOR ART COMPOUND

An adhesive according to Jandourek was prepared by first polymerizing acrylic acid in water at 85° C. with ammonium persulphate initiator using the method of British Pat. No. 1,139,430. The adduct of polyacrylic acid (PAA) with glycidyl methacrylate was prepared as follows: 1.63 g redistilled glycidyl methacrylate was added to 5.00 g PAA dissolved in 50 ml of dimethylformamide. To this solution was added 49.7 mg triphenylstibine and 16.6 mg triphenylphosphine as catalyst. After 18 hours reaction at 100° C. no epoxide groups could be detected by infra-red spectroscopy. The polymer was then precipitated by drop-wise addition of the reaction mixture to chloroform. After washing the precipitate with fresh chloroform the product was dried over silica in a vacuum desiccator.

A 5% solution of this polymer in ethanol was used as the adhesive. The bond strength to dentine and composite resin was measured as described above. The bond strength was 0.52 MPa with a standard deviation of 0.30 MPa.

A 20% by weight solution of the PAA/glycidyl methacrylate polymer containing 0.2% benzoyl peroxide was mixed with another 20% solution containing 0.2% bishydroxyethyl-p-toluidine (BHET). The bond strength to dentine and composite resin was measured by the method described above. The bond strength of this composition was 0.37 MPa with a standard deviation of 0.36 MPa.

EXAMPLE 1

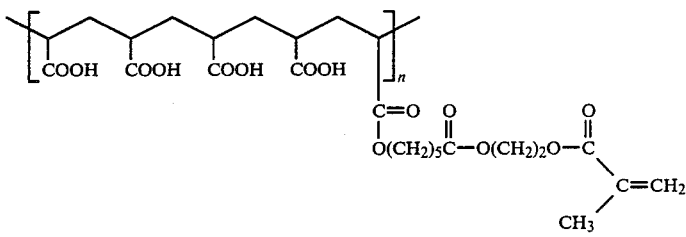

A solution of poly(acrylic acid) (PAA, 10.2 g), 4-dimethylamino pyridine (0.6 g) and Placcel FM-1 monomer* (12.0 g) in anhydrous DMF (180 ml) was cooled to 0° C., treated with N,N'-dicyclohexylcarbodiimide (8.4 g) and stirred at room temperature for 60 hours. The mixture was cooled to 0° C., stirred a further 1 hour and filtered to remove the precipitated N,N'-dicyclohexyl urea. The filtrate was added slowly to cold aqueous HCl and the polymer (1) collected and washed thoroughly with distilled water. Purification can be achieved by precipitation of (1) from a solution in DMF with benzene. $^1$H NMR spectroscopy confirmed the grafting of the FM-1 monomer onto the poly(acrylic acid) and showed a ratio of COOH to C=CH$_2$ of 7:1.

*Placcel FM-1 monomer is a condensate of ε-caprolactone and 2-hydroxyethyl methacrylate produced by Daicel Chemical Industries Ltd. in Japan.

A 5% solution of this polymer in ethanol was used as the adhesive. The bond strength to dentine and composite resin was measured as described above. The bond strength was 1.8 MPa with a standard deviation of 0.80 MPa.

A 20% by weight solution of the above polymer containing 0.5% benzoyl peroxide was mixed with another 20% solution containing 0.5% bishydroxyethyl-p- toluidine (BHET). The bond strength, measured by the method described above, between dentine and composite resin using this adhesive was 2.2 MPa with a standard deviation of 1.0 MPa.

It will thus be seen that the adhesive of the present invention is superior to the prior art material of Jandourek.

EXAMPLE 2

The PAA-FM1 polymer of Example 1 was used to prepare the following solution.

| PAA-FM1 polymer (20% solution in ethanol) | 80 parts |
| --- | --- |
| Ethanol | 9 parts |
| Water | 9.5 parts |
| Camphorquinone | 0.5 parts |
| BHET | 0.5 parts |

This solution was mixed with an equal volume of a 1% solution of sodium p-toluene sulphonate in ethanol. The thus formed adhesive was applied, cured (for 20 seconds) and tested by the methods described above. The bond strength of the adhesive was thus determined as 3.3 MPa with a standard deviation of 1.2 MPa.

EXAMPLE 3

The PAA-FM1 polymer was used to prepare the following solutions.

Solution A

| PAA-FM1 polymer (20% solution in ethanol) | 80 parts |
| --- | --- |
| Hydroxyethyl methacrylate (HEMA) | 10 parts |
| Water | 10 parts |
| Benzoyl peroxide | 0.5 parts |
| Sodium p-toluenesulphonate | 1 parts |

Solution B

| PAA-FM1 polymer (20% solution in ethanol) | 80 parts |
| --- | --- |
| HEMA | 10 parts |
| Water | 10 parts |
| BHET | 0.5 parts |
| Hydroquinone (HQ) | 0.05 parts |

Equal parts of solutions A and B mixed and the thus formed adhesive was applied, cured and tested by the methods described above.

The bond strength of the adhesive was 4.0 MPa with a standard deviation of 1.6 MPa.

EXAMPLE 4

(Comparative Example)

Example 3 was repeated except that in solutions A and B the PAA-FM1 polymer was replaced by the prior art polymer described above.

The resulting adhesive had a bond strength of 0.8 MPa with a standard deviation of 0.4 MPa.

We claim:

1. An adhesive for attaching polymeric or polymerizable restorative materials to dentine or other tooth structure, which comprises a polymer with pendent ethylenic unsaturation made by the reaction of (a) a condensate of $\epsilon$-caprolactone with one or more acrylic monomers containing hydroxy groups and (b) a polymer containing binding groups capable of binding to the dentine or other tooth structure.

2. An adhesive as claimed in claim 1, wherein component (a) is a condensate of $\epsilon$-caprolactone and 2-hydroxyethyl methacrylate.

3. An adhesive as claimed in claim 2, wherein the condensate has the formula

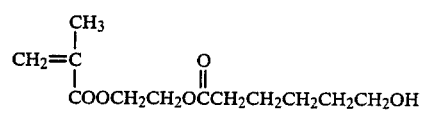

4. An adhesive as claimed in claim 1, wherein the polymer (b) contains a multiplicity of dentine binding groups.

5. An adhesive as claimed in claim 1, wherein the binding groups are carboxylic acid groups.

6. An adhesive as claimed in claim 5, wherein the carboxylic acid groups are —COOH, —$(CH_2)_n$COOH, where n may be from a 1 to 60,

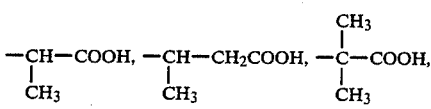

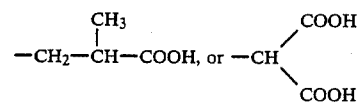

7. An adhesive as claimed in claim 5, wherein the carboxylic acid groups are connected to the polymer (b) chain either directly or via a branched or unbranched, substituted or unsubstituted alkene group.

8. An adhesive as claimed in claim 5, wherein the carboxylic acid groups are part of a further polymer or oligomer chain attached to the polymer (b) chain of the adhesive molecule, which further polymer or oligomer chains may themselves contain a plurality of carboxylic groups.

9. An adhesive as claimed in claim 1, wherein the binding groups are phosphate or related groups.

10. An adhesive composition comprising the adhesive of claim 1, together with one or more further components selected from polymerizable monomers, polymerization initiators and fillers.

11. An adhesive as claimed in claim 2 wherein the polymer (b) contains a multiplicity of dentine binding groups.

12. An adhesive as claimed in claim 3 wherein the polymer (b) contains a multiplicity of dentine binding groups.

13. An adhesive as claimed in claim 2 wherein the binding groups are carboxylic acid groups.

14. An adhesive as claimed in claim 3 wherein the binding groups are carboxylic acid groups.

15. An adhesive as claimed in claim 4 wherein the binding groups are carboxylic acid groups.

16. An adhesive as claimed in claim 12 wherein the dentine binding groups are groups capable of binding calcium.

17. An adhesive as claimed in claim 12 wherein the dentine binding groups are phosphate groups.

* * * * *

UNITED STATES PATENT AND TRADEMARK OFFICE
CERTIFICATE OF CORRECTION

PATENT NO. : 4,732,943

DATED : March 22, 1988

INVENTOR(S) : Beech et al

It is certified that error appears in the above-identified patent and that said Letters Patent is hereby corrected as shown below:

On the cover page, at item [73] Assignee:
Please insert after "Organization", --and The Commonwealth of Australia--.

Signed and Sealed this

Eighth Day of November, 1988

Attest:

Attesting Officer

DONALD J. QUIGG

Commissioner of Patents and Trademarks